United States Patent
Harman (10) Patent No.: US 7,766,279 B2
(45) Date of Patent: Aug. 3, 2010

(54) VORTEX RING GENERATOR

(75) Inventor: Jayden David Harman, San Rafael, CA (US)

(73) Assignee: NewPax, Inc., Novato, CA (US)

( * ) Notice: Subject to any disclaimer, the term of this patent is extended or adjusted under 35 U.S.C. 154(b) by 63 days.

(21) Appl. No.: 11/980,168

(22) Filed: Oct. 29, 2007

(65) Prior Publication Data

US 2008/0265101 A1 Oct. 30, 2008

Related U.S. Application Data

(63) Continuation of application No. 10/884,032, filed on Jul. 2, 2004, now Pat. No. 7,673,834, which is a continuation of application No. PCT/AU03/00003, filed on Jan. 3, 2003.

(30) Foreign Application Priority Data

Jan. 3, 2002 (AU) ................... PR9827
Mar. 26, 2002 (AU) ................... PS1352

(51) Int. Cl.
*B64C 23/06* (2006.01)

(52) U.S. Cl. .................. 244/199.1

(58) Field of Classification Search ........ 244/199, 244/198, 206, 200, 130, 199.1, 53 B; 102/501; 239/461, 463
See application file for complete search history.

(56) References Cited

U.S. PATENT DOCUMENTS

| 11,544 A | 8/1854 | Andrews |
|---|---|---|
| 700,785 A | 5/1902 | Kull |
| 794,926 A | 7/1905 | Crawford |
| 871,825 A | 11/1907 | Schupmann |
| 879,583 A | 2/1908 | Pratt |
| 943,233 A | 12/1909 | Boyle |
| 965,135 A | 7/1910 | Gibson |
| 969,101 A | 8/1910 | Gibson |
| 1,023,225 A | 4/1912 | Shlosberg |
| 1,272,180 A | 7/1918 | Andresen |
| 1,353,478 A | 9/1920 | Jeffries, Sr. |
| 1,356,676 A | 10/1920 | Weller et al. |
| 1,396,583 A | 11/1921 | Krafve |
| 1,471,697 A | 10/1923 | Kubes |
| 1,505,893 A | 8/1924 | Hunter et al. |
| 1,658,126 A | 2/1928 | Jehle |
| 1,667,186 A | 4/1928 | Bluehdorn |

(Continued)

FOREIGN PATENT DOCUMENTS

AU 62946/96 2/1997

(Continued)

OTHER PUBLICATIONS

Batchelor, G. K., "An Introduction to Fluid Dynamics", Cambridge Mathematical Library, 2000.

(Continued)

*Primary Examiner*—Tien Dinh
(74) *Attorney, Agent, or Firm*—Carr & Ferrell LLP (57) ABSTRACT

A vortex ring generator adapted to be associated with a body subjected to fluid flow, the vortex ring generator being adapted to produce a fluid flow in the form of a vortex ring with the fluid flow moving over the body from the vortex ring generator.

13 Claims, 7 Drawing Sheets

U.S. PATENT DOCUMENTS

| | | |
|---|---|---|
| 1,709,217 A | 4/1929 | Hamilton |
| 1,713,047 A | 5/1929 | Maxim |
| 1,729,018 A | 9/1929 | Siders |
| 1,756,916 A | 4/1930 | Stranahan |
| 1,799,039 A | 3/1931 | Conejos |
| 1,812,413 A | 6/1931 | Reynolds |
| 1,816,245 A | 7/1931 | Wolford |
| 1,872,075 A | 8/1932 | Dolza |
| 1,891,170 A | 12/1932 | Nose |
| 1,919,250 A | 7/1933 | Olson |
| 2,068,686 A | 1/1937 | Lascroux |
| 2,139,736 A | 12/1938 | Durham |
| 2,165,808 A | 7/1939 | Murphy |
| 2,210,031 A | 8/1940 | Greene |
| 2,359,365 A | 10/1944 | Katcher |
| 2,879,861 A | 3/1959 | Belsky et al. |
| 2,908,344 A | 10/1959 | Maruo |
| 2,912,063 A | 11/1959 | Barnes |
| 2,958,390 A | 11/1960 | Montague |
| 3,066,755 A | 12/1962 | Diehl |
| 3,071,159 A | 1/1963 | Coraggioso |
| 3,076,480 A | 2/1963 | Vicard |
| 3,081,826 A | 3/1963 | Loiseau |
| 3,082,695 A | 3/1963 | Buschhorn |
| 3,215,165 A | 11/1965 | Broadway |
| 3,232,341 A | 2/1966 | Woodworth |
| 3,339,631 A | 9/1967 | McGurty |
| 3,371,472 A | 3/1968 | Krizman, Jr. |
| 3,407,995 A | 10/1968 | Kinsworthy |
| 3,584,701 A | 6/1971 | Freeman |
| 3,692,422 A | 9/1972 | Girardier |
| 3,800,951 A | 4/1974 | Mourlon |
| 3,927,731 A | 12/1975 | Lancaster |
| 3,940,060 A | 2/1976 | Viets |
| 3,957,133 A | 5/1976 | Johnson |
| 3,964,841 A | 6/1976 | Strycek |
| 4,050,539 A | 9/1977 | Kashiwara et al. |
| 4,182,596 A | 1/1980 | Wellman |
| 4,206,783 A | 6/1980 | Brombach |
| 4,211,183 A | 7/1980 | Hoult |
| 4,225,102 A | 9/1980 | Frosch et al. |
| 4,299,553 A | 11/1981 | Swaroop |
| 4,317,502 A | 3/1982 | Harris et al. |
| 4,323,209 A | 4/1982 | Thompson |
| 4,331,213 A | 5/1982 | Taniguchi |
| 4,505,297 A | 3/1985 | Leech et al. |
| 4,533,015 A | 8/1985 | Kojima |
| 4,540,334 A | 9/1985 | Stahle |
| 4,579,195 A | 4/1986 | Nieri |
| 4,644,135 A | 2/1987 | Daily |
| 4,679,621 A | 7/1987 | Michele |
| 4,685,534 A | 8/1987 | Burstein et al. |
| 4,699,340 A | 10/1987 | Rethorst |
| 4,823,865 A | 4/1989 | Hughes |
| 4,834,142 A | 5/1989 | Johannessen |
| 4,993,487 A | 2/1991 | Niggemann |
| 5,010,910 A | 4/1991 | Hickey |
| 5,040,558 A | 8/1991 | Hickey et al. |
| 5,052,442 A | 10/1991 | Johannessen |
| 5,058,837 A | 10/1991 | Wheeler |
| 5,100,242 A | 3/1992 | Latto |
| 5,139,215 A | 8/1992 | Peckham |
| 5,181,537 A | 1/1993 | Powers |
| 5,207,397 A | 5/1993 | Ng et al. |
| 5,220,955 A | 6/1993 | Stokes |
| 5,249,993 A | 10/1993 | Martin |
| 5,261,745 A | 11/1993 | Watkins |
| 5,312,224 A | 5/1994 | Batchelder et al. |
| 5,336,789 A | 8/1994 | Tihon et al. |
| 5,382,092 A | 1/1995 | Okamoto et al. |
| 5,624,229 A | 4/1997 | Kotzur et al. |
| 5,661,638 A | 8/1997 | Mira |
| 5,741,118 A | 4/1998 | Shinbara et al. |
| 5,787,974 A | 8/1998 | Pennington |
| 5,844,178 A | 12/1998 | Lothringen |
| 5,891,148 A | 4/1999 | Deckner |
| 5,934,612 A | 8/1999 | Gerhardt |
| 5,934,877 A | 8/1999 | Harman |
| 5,943,877 A | 8/1999 | Chen |
| 5,954,124 A | 9/1999 | Moribe et al. |
| 6,050,772 A | 4/2000 | Hatakeyama et al. |
| 6,179,218 B1 | 1/2001 | Gates |
| 6,241,221 B1 | 6/2001 | Wegner et al. |
| 6,273,679 B1 | 8/2001 | Na |
| 6,374,858 B1 | 4/2002 | Hides et al. |
| 6,382,348 B1 | 5/2002 | Chen |
| 6,385,967 B1 | 5/2002 | Chen |
| 6,415,888 B2 | 7/2002 | An et al. |
| 6,484,795 B1 | 11/2002 | Kasprzyk |
| 6,604,906 B2 | 8/2003 | Ozeki |
| 6,623,838 B1 | 9/2003 | Nomura et al. |
| 6,632,071 B2 | 10/2003 | Pauly |
| 6,669,142 B2 | 12/2003 | Saiz |
| 6,684,633 B2 | 2/2004 | Jett |
| D487,800 S | 3/2004 | Chen et al. |
| 6,702,552 B1 | 3/2004 | Harman |
| 6,817,419 B2 | 11/2004 | Reid |
| 6,892,988 B2 | 5/2005 | Hugues |
| 6,932,188 B2 | 8/2005 | Ni |
| D509,584 S | 9/2005 | Li et al. |
| 6,959,782 B2 | 11/2005 | Brower et al. |
| 7,117,973 B2 | 10/2006 | Graefenstein |
| D539,413 S | 3/2007 | Parker et al. |
| 2002/0148777 A1 | 10/2002 | Tuszko et al. |
| 2004/0037986 A1 | 2/2004 | Houston et al. |
| 2004/0238163 A1 | 12/2004 | Harman |
| 2004/0244853 A1 | 12/2004 | Harman |
| 2005/0011700 A1 | 1/2005 | Dadd |
| 2005/0155916 A1 | 7/2005 | Tuszko et al. |
| 2005/0269458 A1 | 12/2005 | Harman |
| 2006/0102239 A1 | 5/2006 | Harman |
| 2006/0249283 A1 | 11/2006 | Harman |
| 2007/0003414 A1 | 1/2007 | Harman |
| 2007/0025846 A1 | 2/2007 | Harman |

FOREIGN PATENT DOCUMENTS

| | | |
|---|---|---|
| DE | 003315258 | 10/1984 |
| EP | 14257 | 8/1980 |
| EP | 0598253 | 5/1994 |
| FR | 2534981 A | 10/1982 |
| FR | 2666031 A | 2/1992 |
| GB | 873135 | 7/1961 |
| GB | 2057567 A | 4/1981 |
| GB | 2 063 365 A | 6/1981 |
| JP | 98264 | 6/1932 |
| JP | 98264 B | 6/1932 |
| JP | 129699 | 8/1979 |
| JP | S54129699 | 10/1979 |
| JP | 05332121 | 12/1993 |
| JP | 00257610 | 9/2000 |
| JP | 2000257610 | 9/2000 |
| JP | D1243052 | 6/2005 |
| SU | 738566 | 6/1980 |
| SU | 850104 | 7/1981 |
| SU | 1030631 | 7/1983 |
| TW | 565374 | 3/2002 |
| TW | M287387 | 2/2006 |
| WO | WO 81/03201 | 11/1981 |
| WO | WO 87 07048 A | 11/1987 |
| WO | WO 89 08750 A | 9/1989 |
| WO | WO 00/38591 | 7/2000 |
| WO | WO 01 14782 | 3/2001 |
| WO | WO 03 056228 A | 7/2003 |

| | | |
|---|---|---|
| WO | WO 03/056269 A1 | 7/2003 |
| WO | WO 2005/045258 | 5/2005 |
| WO | WO 2005/073561 | 8/2005 |

OTHER PUBLICATIONS

The CAD Guidebook, A Basic Manual for Understanding and Improving Computer-Aided Design, Stephen J. Schoonmaker, Marcel Dekker, Inc., New York, 2002.

Derwent Abstract Accession No. 87-318963/45, SU 1291726 A (Makeevka Eng Cons) Feb. 23, 1987.

Derwent Abstract Accession No. 99-249047/32, JP 11072104 A (Saito Jidosha Shatai Kogyo KK) Mar. 16, 1999.

Patent Abtracts of Japan, Publication No. 2000-168632, Jun. 20, 2000, "Low Air Resistance Vehicle Body Using Vortex Ring."

Derwent Abstract Accession No. 97-198067/18, JP 09053787 A (Kajima Corp) Feb. 25, 1997.

Derwent Abstract Accession No. 97-546288/50, JP 09264462 A (Sekisui Chem Ind Co Ltd) Oct. 7, 1997.

Derwent Abstract Accession No. 1999-380417/32, JP 11148591 A (TLV Co Ltd) Jun. 2, 1999.

Derwent Abstract Accession No. E6575C/21, SU 687306A (Leningrad Forestry Acad) Sep. 28, 1977.

Derwent Abstract Accession No. N8420 E/42, SU 887876 A (As Ukr Hydromechani) Dec. 7, 1981.

Derwent Abstract Accession No. 85-073498/12, SU 1110986 A (Korolev A S) Aug. 30, 1984.

Derwent Abstract Accession No. 89-075095/10, SU 1418540 A (As Ukr Hydrodynamic) Aug. 23, 1988.

Derwent Abstract Accession No. 91-005279, SU 1560887 A (Sredaztekhenergo En) Apr. 30, 1990.

Derwent Abstract Accession No. 93-375668/47, SU 1756724 A (Odess Poly) Aug. 30, 1992.

Derwent Abstract Accession No. L0015B/47, SE 7803739 A (Ingenjorsfirma Garl) Nov. 5, 1979.

Dr. Knott, Ron, "The Golden Section Ration: Phi," Available at http://www.mcs.surrey.ac.uk/Personal/R.Knott/Fibonacci/phi.html.

Derwent Abstract Accession No. 89-157673, SU 1437579A (Lengd Kalinin Poly) Nov. 15, 1988.

K. Foster et al., "Fluidics Components and Circuits," Wiley-Interschience, London, 1971, pp. 219-221.

Karassik et al "Pump Handbook" pub. 1976 by McGraw-Hill, Inc.

McLarty et al., "Phi Geometry: Impeller & Propeller Design for Fluids Handling", Offshore Magazine, pp. 123—Oct. 1999.

Derwent Abstract Accession No. K2273W/37, SU 431850 A (Fishing Ind Exp), (Apr. 1975).

Derwent Abstract Accession No. 51960 E/25, SU 858896 A (Onatskii P A), (Aug. 1981).

Merriam-Webster Online Dictionary, 2010 http://www.merriam-webster.com/dictionary/spiral, Feb. 23, 2010, two pages.

Merriam-Webster Online Dictionary, 2010 http://www.merriam-webster.com/dictionary/curve, Feb. 23, 2010, two pages.

Merriam-Webster Online Dictionary, 2010 http://www.merriam-webster.com/dictionary/vortex, Feb. 23, 2010, two pages.

Merriam-Webster Online Dictionary, 2010 http://www.merriam-webster.com/dictionary/vortical, Feb. 23, 2010, two pages.

VORTEX RING GENERATOR

CROSS REFERENCE TO RELATED APPLICATIONS

This application is a continuation and claims the priority benefit of U.S. patent application Ser. No. 10/884,032 filed Jul. 2, 2004 now U.S. Pat. No. 7,673,834 and entitled "Vortex Ring Generator," which is a continuation and claims the priority benefit of Patent Cooperation Treaty application number PCT/AU03/00003 filed Jan. 3, 2003, which in turn claims the priority benefit of Australian patent application number PR 9827 filed Jan. 3, 2002 and Australian patent application number PS 1352 filed Mar. 26, 2002. The disclosure of these applications is incorporated herein by reference.

BACKGROUND OF THE INVENTION

1. Field of the Invention

The present invention relates to the field of fluid mechanics and more particularly to the flow of a fluid relative to a body. More particularly, this invention seeks to reduce drag on a body or fuselage during relative movement of the body with respect to a fluid.

The invention is described herein by reference to its use in respect to any mobile body or fuselage, such as, including, but not limited to, projectiles, missiles, torpedoes, submarines and aircraft. However, the invention is not restricted to mobile fuselages, but may also be used to reduce drag on stationary bodies such as buildings, bridge pilings, and fixed obstacles in watercourses, airways or other fluid flow fields. Such applications are intended to be within the scope of the invention although not specifically described herein.

2. Background Art

The greatest obstacle to obtaining optimum efficiency in streamlining a fuselage is surface friction. This can be in several forms but typically is one of or a combination of boundary layer drag, skin friction, viscosity, surface tension, cavitation and turbulence.

Existing technologies seek to reduce this drag and optimise the energy efficiency of a moving body or fuselage by altering its surface to be as smooth as possible with the least possible protuberances or alternatively to roughen the smooth surface or to give it a rippling surface similar to that of a shark, dolphin or golf ball. The objective is to minimise the effects of drag from fluids flowing past. Another attempt to cut drag has included the fitting of small vortex generators to wings and other parts of the fuselage. A further attempt has been to fit a spike-like protuberance extending forwardly in the direction of travel of the fuselage through the fluid.

In general, it has been an objective of these attempts to maintain straight, laminar flow over the body of the fuselage, and to suppress separation or turbulence as far as is possible. Alternatively, through the use of dimpled or roughen surfaces and vortex generators, the objective has been to create myriad eddies in close proximity to the fuselage surface to break up the boundary layer. Essentially, all these approaches are designed to assist fluids slide past the body with a minimum of friction.

SUMMARY OF THE INVENTION

A first embodiment of the claimed invention provides for a vortex ring generating system inclusive of a body and spiraled surfaces affixed to the body. The body propels fluid from a forward portion to a rear portion when in motion. The spiraled surfaces are alternately concave and convex surfaces. A portion of each surface conforms substantially to a logarithmic spiral, wherein the radius of the logarithmic spiral measured at equiangular radii unfolds at a constant order of growth. The spiraled surfaces commence near the forward portion of the body and terminate near a rear portion of the body. The surfaces generate a vortex ring surrounding the body as the body propels the fluid from the forward portion toward the rear portion.

A second embodiment of the claim invention provides for a vortex ring generator that includes a mobile body and vanes extending outward from the body, which includes a nose and a tail. The vanes commence near the nose and end near the tail. The vanes define a spiral path around the body and are alternately configured as concave and convex surfaces. A portion of each surface of the plurality of vanes conforms substantially to a logarithmic spiral, wherein the radius of the logarithmic spiral measured at equiangular radii unfolds at a constant order of growth. The vanes generate a vortex ring with respect to a fluid incident to the mobile body and propel the fluid from the nose of the body toward the tail of the body.

A third claimed embodiment of the present invention includes a mobile body configured to reduce drag in a flowing fluid. The mobile body includes an axis aligned with a direction of the flowing fluid relative to the mobile body. The mobile body includes a nose and tail. A vortex ring generator coupled to the body includes a helical vane disposed around a central axis aligned with the axis of the body, the vane extending from the nose to the tail of the body. The vane includes alternately configured concave and convex surfaces. A portion of the helical vane conforms to a logarithmic curve, wherein the radius of the logarithmic curve measured at equiangular radii unfolds at a constant order of growth. The vortex ring generator induces a vortex ring around the body whereby the drag of a flowing fluid against the body is reduced as the body propels the flowing fluid along the axis aligned with a direction of the flowing fluid relative to the body.

A method for reducing drag on a mobile body in a fluid is provided and claimed. The method includes configuring the mobile body with spiraled surfaces affixed to the mobile body. The spiraled surfaces are alternately configured as concave and convex surfaces. A portion of each of the spiraled surfaces conforms substantially to a logarithmic spiral, wherein the radius of the logarithmic spiral measured at equiangular radii unfolds at a constant order of growth. The spiraled surfaces commence near the forward portion of the mobile body and terminate near the rear portion of the mobile body. The spiraled surfaces induce the formation of a vortex ring surrounding the mobile body. The mobile body is then subject to a fluid. Vortex rings are then generated to reduce drag on the mobile body as the fluid flows over the mobile body, the fluid being propelled by the mobile body.

A further claimed method is for generating a vortex ring to reduce drag on a mobile body in a fluid. The body is configuring with spiraled surfaces affixed to the body. The spiraled surfaces are alternately configured as concave and convex surfaces. A portion of each of the spiraled surfaces conforms substantially to a logarithmic spiral, wherein the radius of the logarithmic spiral measured at equiangular radii unfolds at a constant order of growth. The spiraled surfaces commence near the forward portion of the body and terminating near the rear portion of the body. The body is subjected to a fluid and rotated, which propels the fluid from the forward portion of the body toward the rear portion of the body. The rotation of the body generates a vortex ring. As a result, drag is reduced on the body as the fluid flows from the forward portion of the body toward the rear portion of the body.

In a final claimed embodiment, a vortex ring generator comprising a body and a surface is provided. The body is subjected to relative translational movement with a fluid along a line of movement. The body has no substantial rotational movement about an axis parallel to the line of movement. The surface is three dimensional and spiraling in form and coupled to the body. A portion of the surface conforms to a logarithmic curve. The surface generates a vortex ring in the fluid in relation to the body, the vortex ring having an axis substantially parallel to the line of movement.

BRIEF DESCRIPTION OF THE DRAWINGS

The description is made with reference to the accompanying drawings, of which:

FIG. 1 illustrates the form of the Golden Section;

DETAILED DESCRIPTION

Each of the embodiments comprises a vortex ring generator associated with a body and adapted to generate a vortex ring in the fluid moving relative to the body. In each embodiment, the vortex ring generator comprises a fluid pathway having an active surface adapted to influence the flow of the fluid to form the vortex rings flowing past the body.

As stated previously all fluids when moving under the influence of the natural forces of Nature, tend to move in spirals or vortices. These spirals or vortices generally comply with a mathematical progression known as the Golden Ratio or a Fibonacci like Progression.

The greater percentage of the surfaces of the active surfaces of each of the embodiments described herein are generally designed in the greater part, in accordance with the Golden Section or Ratio and therefore it is a characteristic of each of the embodiments that the active surfaces are of a spiralling configuration and which conform at least in greater part to the characteristics of the Golden Section or Ratio. The characteristics of the Golden Section are illustrated in FIG. 1 which illustrates the unfolding of the spiral curve according to the Golden Section or Ratio. As the spiral unfolds the order of growth of the radius of the curve which is measured at equiangular radii (eg E, F, G, H, I and J) is constant. This can be illustrated from the triangular representation of each radius between each sequence which corresponds to the formula of a:b=b:a+b which conforms to the ratio of 1:0.618 approximately and which is consistent through out the curve.

A characteristic of the embodiments is that not only do the X and Y axis conform to Golden Section geometry, but also the Z axis or depth conforms, that is the vanes conform to the Golden Section in three dimensions.

It is an objective of the embodiments to duplicate the lines of vorticity found in a ring vortex. To that end, the active surfaces expand or contract logarithmically in any direction in an equiangular, Golden Section spiral. If any two points are taken on the surface of these active surfaces they will bear a ratio to each other of approximately 1:0.618. The active surfaces can be any length or number of rotations. They are specifically designed to match the internal, streamlined flow lines of vorticity of a vortex.

In the first embodiment, and as shown in FIGS. 2 to 5, the vortex ring generator (11) comprises a set of vanes located at the nose (13) of a body (12). In this specification, the term nose is used to identify the portion of the body which is intended to face the direction from which the relative flow of fluid is approaching the body.

The vortex ring generator (11) is adapted to generate a vortex ring by influencing the flow of the fluid relative to the body in a way which produces a vortex ring. The vanes comprising the vortex ring generator extend forwardly from the nose of the body and have the configuration of a whorl. Each of the vanes are formed with an internal reactive face (14) which is of a concave configuration and which has a three dimensional curvature of a concave nature whereby the curvature in each direction is in accordance with a logarithmic curve conforming to the Golden Section. As a result, the vanes (11) jointly define a generally concave internal face of the vortex ring generator.

In addition, each vane has a remote reactive face (15) which is remote from the internal reactive face (14) and which also has a three dimensional curvature of a convex nature whereby the curvature in each dimension conforms with a logarithmic curve according to the Golden Section, and whereby the curvature in each dimension is of the same form as the curvature of the internal reactive face (14) in each dimension. As a result, the remote reactive faces (15) jointly define a generally convex surface of the vanes.

In an adaptation of the first embodiment, the vortex ring generator is not fixedly mounted to the nose but rather is adapted to rotate coaxially with the axis of the body. In addition, the generator may be driven mechanically to rotate thereby providing propulsion to the body whilst simultaneously generating vortex rings.

Figure 2:
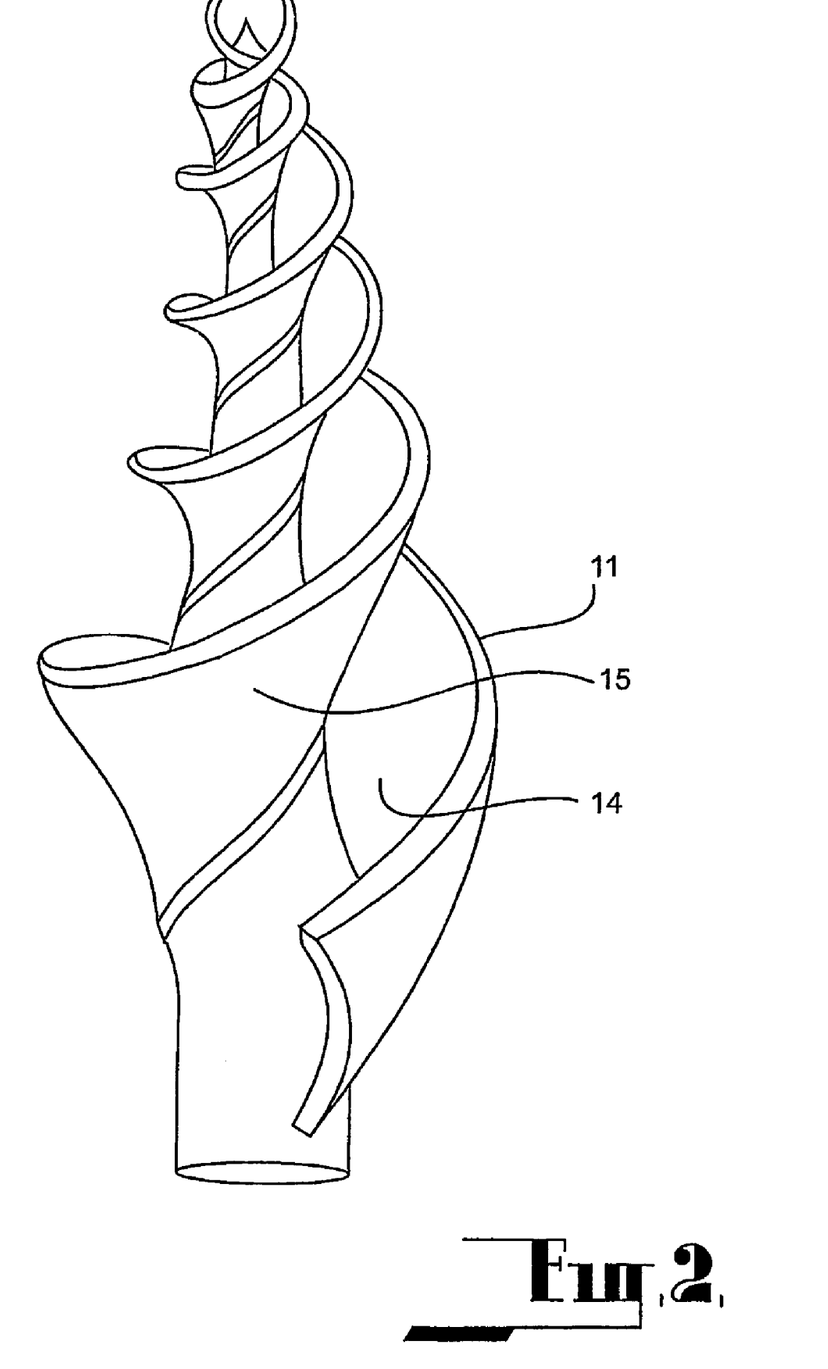
FIG. 2 is a side elevation of a vortex ring generator according to the first embodiment.
Figure 3:
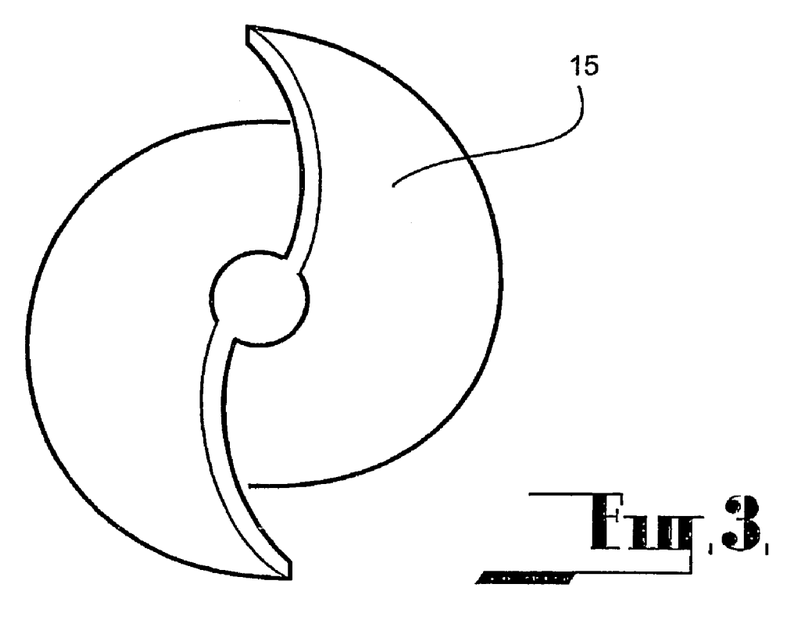
FIG. 3 is a front end view of a vortex ring generator according to the first embodiment.
Figure 4:
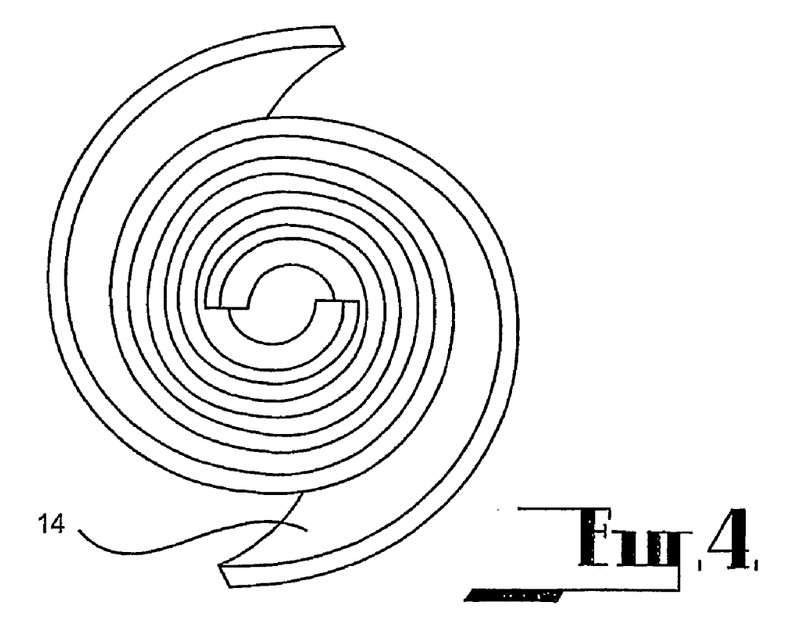
FIG. 4 is a rear end view of a vortex ring generator according to the first embodiment.
Figure 5:
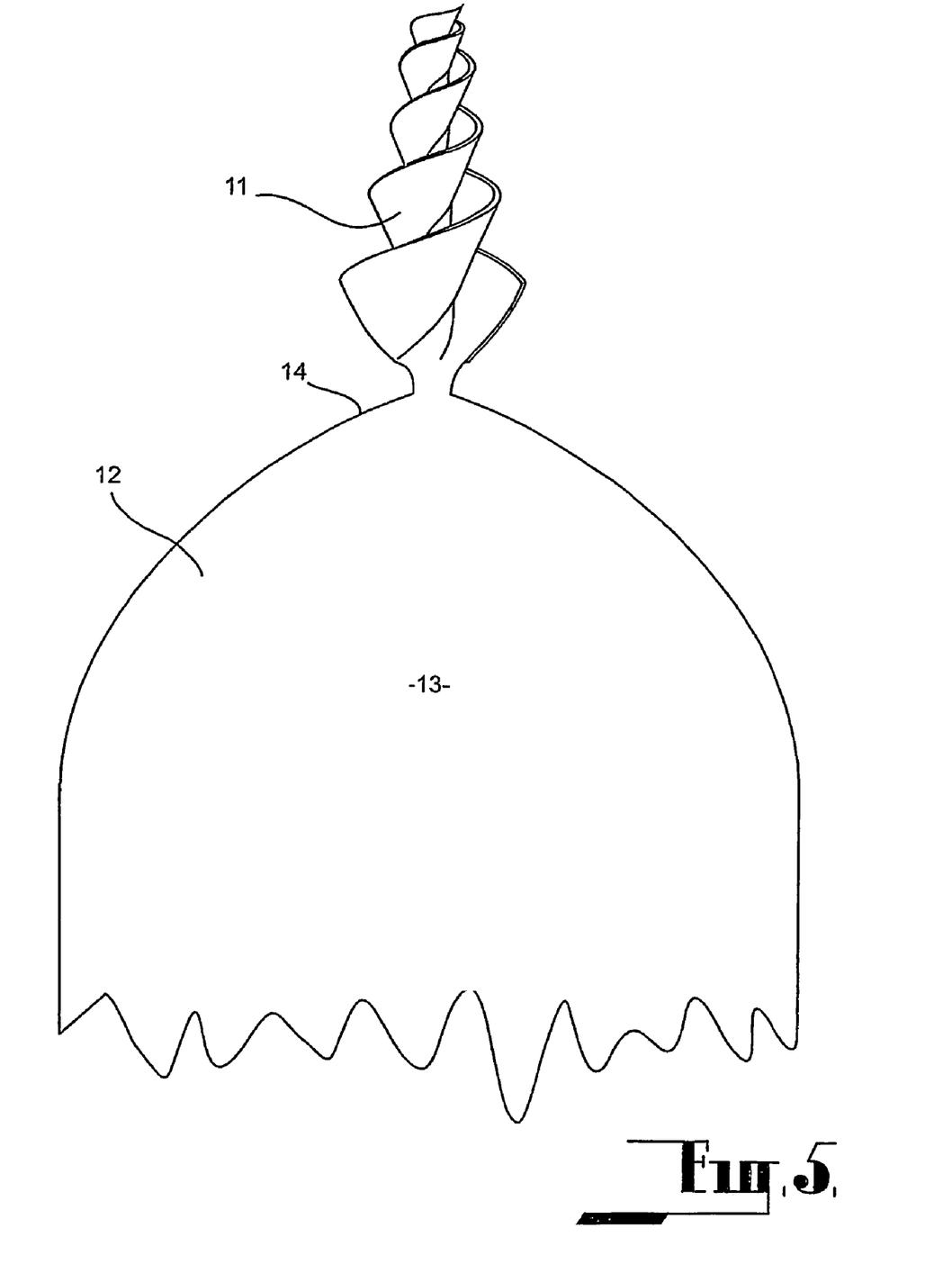
FIG. 5 is a side elevation of a vortex ring generator mounted to a body according to the first embodiment.
Figure 6:
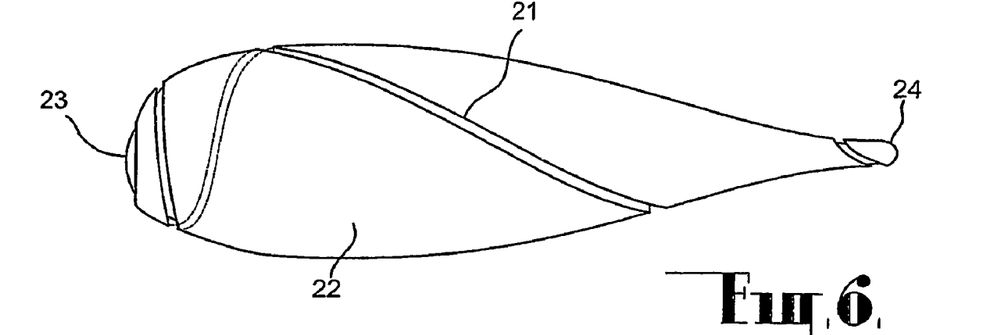
FIG. 6 is a side elevation of a vortex ring generator applied to a body according to the second embodiment.
Figure 7:
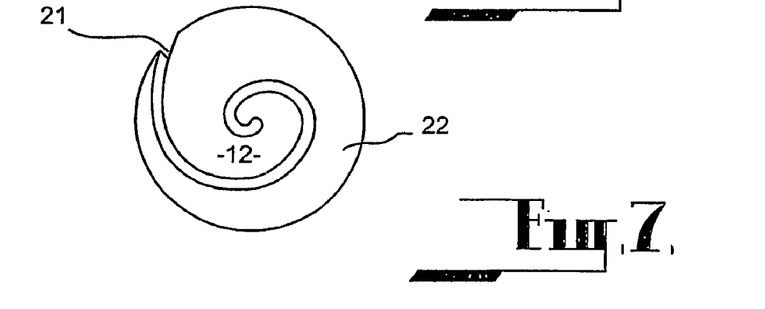
FIG. 7 is a front end view of a vortex ring generator applied to a body according to the second embodiment.

In the second embodiment, as shown in FIGS. 6 and 7, the vortex ring generator comprises a set one or more grooves or flutes (21) in the surface of the body, commencing at or near the nose (23) of the body (22) and ending at or near the tail (24) of the body. The paths of the grooves or flutes along the body spiral around the body in a manner designed to conform to the Golden Ratio.

Figure 8:
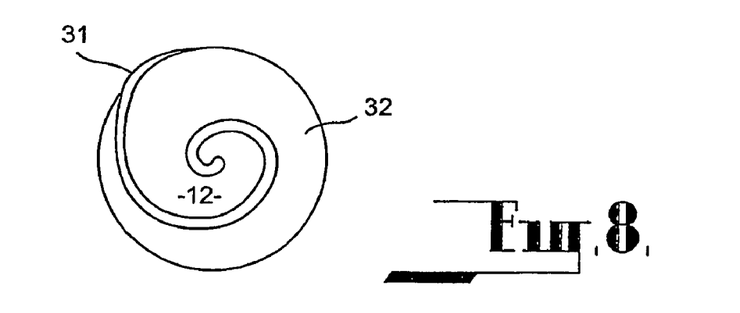
FIG. 8 is a side elevation of a vortex ring generator applied to a body according to a third embodiment.
Figure 9:
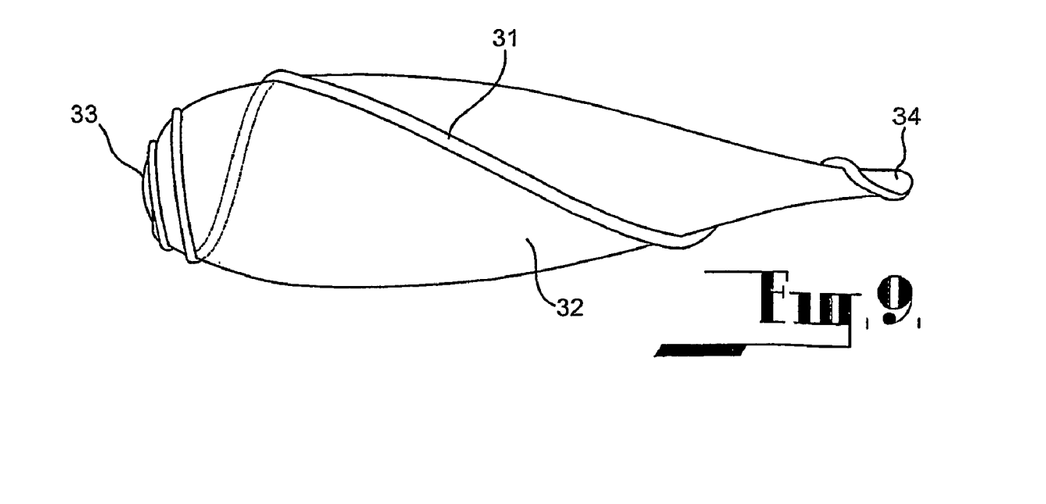
FIG. 9 is a front end view of a vortex ring generator applied to a body according to the third embodiment.

In the third embodiment, as shown in FIGS. 8 and 9, the vortex ring generator comprises a set one or more vanes (31) extending outwardly from the surface of the body, commencing at or near the nose (33) of the body (32) and ending at or near the tail (34) of the body. The paths of the vanes along the body spiral around the body in a manner designed to conform to the Golden Ratio.

The body in each of the above embodiments is ideally designed in accordance with a logarithmic, equiangular, Phi spiral. Its shape is optimally compatible with Phi vortex geometry, which is common to all vortices. In other words the body occupies that space which is seen in the cavitation tube of a visible vortex.

Figure 11:
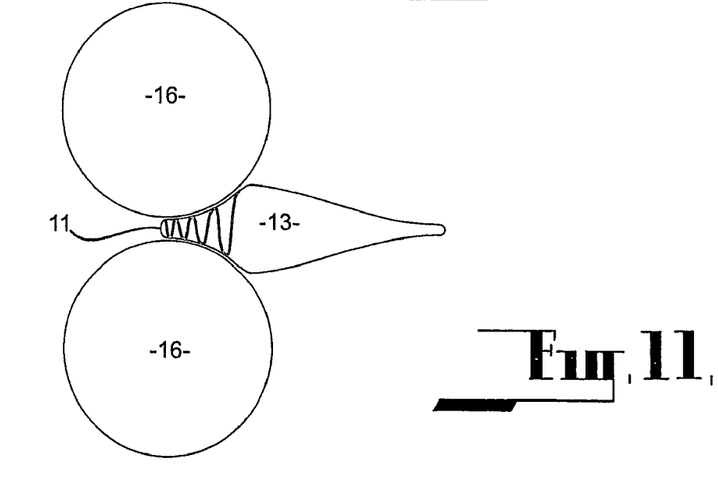
FIG. 11 is a diagrammatic representation of the flow of vortex rings around a body having vortex ring generator according to the second embodiment.

As depicted in FIG. 11, the body, 13, is accommodated within the core of the vortex, 16. The nose of the body, by use of embodiment one, two or three above exactly fits the geometry of a ring vortex. The body may be cone-shaped with a hollow centre allowing fluid incoming to the vortex ring to travel through its core.

Figure 10:
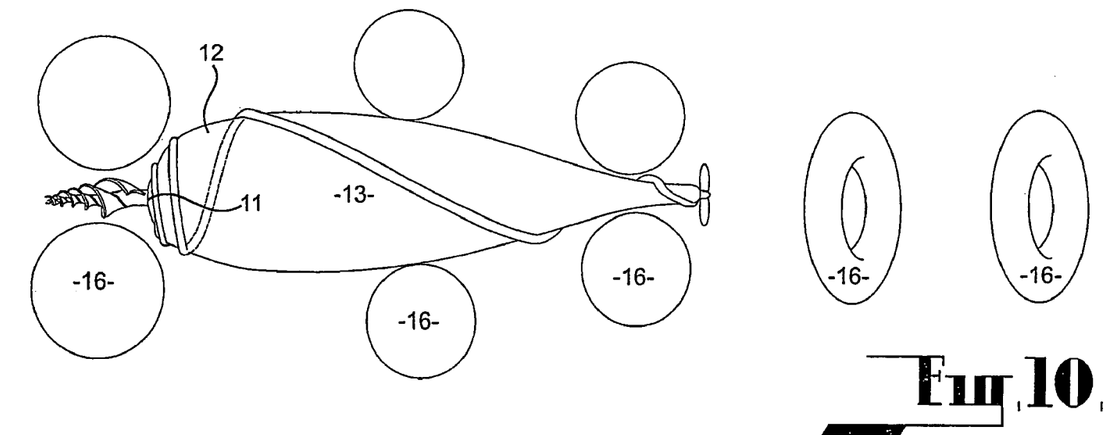
FIG. 10 is a diagrammatic representation of the flow of vortex rings around a body having vortex ring generator according to the first and third embodiments.

FIGS. 10 and 11 illustrate the creation of ring vortices, 16, which travel/roll along the body.

In operation, with relative movement between the fluid and the body, the fluid is engaged by the active surfaces 11, 21 or 31 and commences rotating in a logarithmic vortical fashion. As the fluid engages the active surfaces, the rotary motion creates a low-pressure area at the base of the vortex generator (the interface between the generator and the nose of the body). This reduces the boundary layer drag of the body. A ring and/or potential vortex is established. As can be seen in FIG. 10, the ring vortex rolls up the boundary layer, like ball bearings, along the body walls. In many applications vortex rings will shed and give rise to a stream of shed vortex rings. The wake left behind the body is in the shape of vortex rings.

Figure 12:
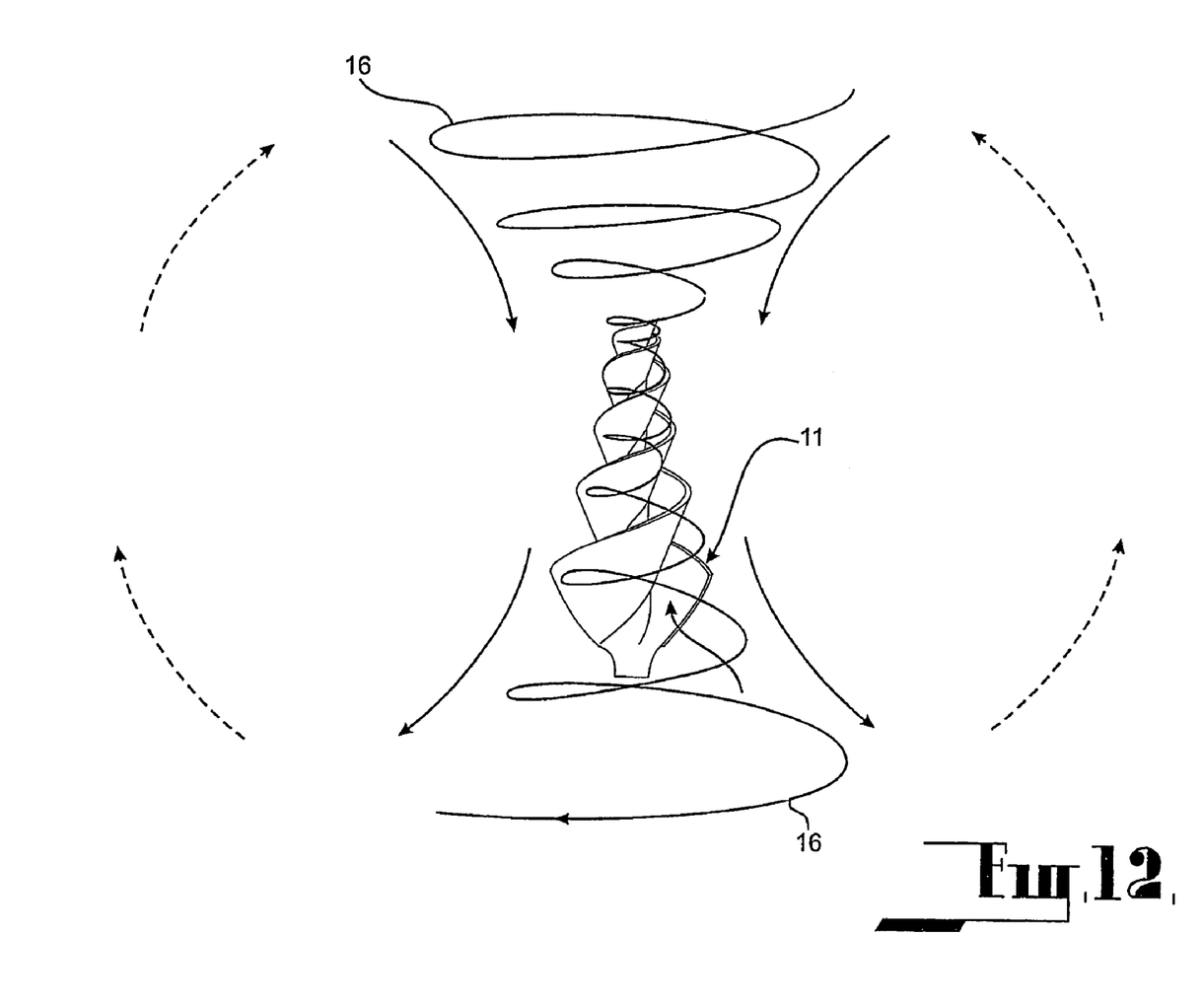
FIG. 12 is a diagrammatic representation of the generation of a vortex ring around by vortex ring generator according to the first embodiment.

FIG. 12 illustrates the vortex ring generator, 11 of the first embodiment creating a ring vortex, 16. To do so, there must be relative motion between the vortex ring generator, 11, and the fluid.

This motion can be created by rotation of the vortex ring generator; the movement of fluid past a stationary vortex ring generator, or the propulsion of the body and vortex ring generator through the fluid.

It should be appreciated that the scope of the present invention need not be limited to the particular scope described above.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A vortex ring generating system, comprising:
   a body subjected to a fluid, the body configured to propel the fluid from a forward portion of the body to a rear portion of the body when the body is in motion; and
   a plurality of spiraled surfaces affixed to the body, the plurality of spiraled surfaces alternately configured as concave and convex surfaces, a portion of each of the plurality of spiraled surfaces conforming substantially to a logarithmic spiral, wherein the radius of the logarithmic spiral measured at equiangular radii unfolds at a constant order of growth, the plurality of spiraled surfaces commencing proximate the forward portion of the body and terminating proximate the rear portion of the body, the plurality of spiraled surfaces configured to generate a vortex ring surrounding the body as the body propels the fluid from the forward portion of the body toward the rear portion of the body wherein each of the plurality spiraled surfaces includes one or more vanes, wherein at least a portion of each of the one or more vanes are incident to the fluid.

2. The vortex ring generating system of claim 1, wherein each of plurality of spiraled surfaces is permanently affixed to the body such that each of the plurality of spiraled surfaces does not rotate independent of the body.

3. The vortex ring generating system of claim 1, wherein each of the plurality of spiraled surfaces extend without interruption from the forward portion of the body to the rear portion of the body.

4. The vortex ring generating system of claim 1, wherein the one or more vanes each include a surface area conforming substantially to a logarithmic curve, wherein the radius of the logarithmic curve measured at equiangular radii unfolds at a constant order of growth.

5. The vortex ring generating system of claim 1, wherein the plurality of spiraled surfaces are configured in a path around and along the body.

6. The vortex ring generating system of claim 5, wherein the path of the plurality of spiraled surfaces conforms substantially to a logarithmic spiral, wherein the radius of the logarithmic spiral measured at equiangular radii unfolds at a constant order of growth.

7. A vortex ring generator comprising:
   a mobile body including a nose and a tail; and
   a plurality of vanes extending outwardly from the mobile body, the plurality of vanes commencing near the nose of the mobile body and ending near the tail of the mobile body, the plurality of vanes defining a spiral path around the mobile body, the plurality of vanes alternately configured as concave and convex surfaces, a portion of each surface of the plurality of vanes conforming substantially to a logarithmic spiral, wherein the radius of the logarithmic spiral measured at equiangular radii unfolds at a constant order of growth, the plurality of vanes configured to generate a vortex ring with respect to a fluid incident to the mobile body, the plurality of vanes further configured to propel the fluid from the nose of the mobile body toward the tail of the mobile body.

8. The vortex ring generator of claim 7, wherein the plurality of vanes is permanently affixed to the mobile body such that the plurality of vanes does not rotate independent of the mobile body.

9. The vortex ring generator of claim 7, wherein the spiral path of the plurality of vanes conforms substantially to a logarithmic spiral, wherein the radius of the logarithmic spiral measured at equiangular radii unfolds at a constant order of growth.

10. The vortex ring generator of claim 7, wherein the shape of the mobile body conforms to a shape of a vortex cavitation tube.

11. The vortex ring generator of claim 7, wherein the mobile body is conical in shape with a hollow centre.

12. A mobile body configured to reduce drag in a flowing fluid, the mobile body comprising:
   an axis aligned with a direction of the flowing fluid relative to the mobile body, the mobile body including a nose and a tail; and
   a vortex ring generator coupled to the mobile body, the vortex ring generator including a helical vane disposed around a central axis aligned with the axis of the mobile body, the helical vane extending from the nose of the mobile body to the tail of the mobile body, the helical vane having a plurality of surfaces, the surfaces alternately configured as concave and convex surfaces, a portion of the helical vane conforming to a logarithmic curve, wherein the radius of the logarithmic curve measured at equiangular radii unfolds at a constant order of growth, the vortex ring generator configured to induce the flowing fluid to form a vortex ring around the body whereby the drag of the flowing fluid against the mobile body is reduced as the mobile body propels the flowing fluid along the axis aligned with a direction of the flowing fluid relative to the mobile body.

13. The mobile body of claim 12, wherein the vortex ring generator further projects outward from the nose of the mobile body.

\* \* \* \* \*